(12) United States Patent
Kawada

(10) Patent No.: US 6,766,587 B2
(45) Date of Patent: Jul. 27, 2004

(54) MULTI-POINT FRAME-FIXING UNIT TYPE LINEAR DISPLACEMENT MEASURING APPARATUS AND METHOD OF FIXING THE SAME

(75) Inventor: Hiroaki Kawada, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/455,395

(22) Filed: Jun. 6, 2003

(65) Prior Publication Data

US 2004/0004728 A1 Jan. 8, 2004

(30) Foreign Application Priority Data

Jun. 25, 2002 (JP) ........................................ 2002-184817

(51) Int. Cl.[7] .............................................. G01B 11/04
(52) U.S. Cl. ........................................ 33/702; 33/706
(58) Field of Search .......................... 33/702, 703, 704, 33/705, 706, 707, 708

(56) References Cited

U.S. PATENT DOCUMENTS

| | | | | |
|---|---|---|---|---|
| 4,444,504 A | * | 4/1984 | Takizawa | 33/706 |
| 5,375,338 A | | 12/1994 | Nelle | |
| 5,611,148 A | * | 3/1997 | Affa | 33/702 |
| 5,664,336 A | * | 9/1997 | Zanier et al. | 33/706 |
| 6,092,296 A | * | 7/2000 | Nelle | 33/706 |
| 6,145,213 A | * | 11/2000 | Shimano et al. | 33/702 |
| 6,701,634 B2 | * | 3/2004 | Henshaw et al. | 33/706 |

* cited by examiner

*Primary Examiner*—G. Bradley Bennett
(74) *Attorney, Agent, or Firm*—Oliff & Berridge, PLC

(57) ABSTRACT

A multi-point frame-fixing unit type linear displacement measuring apparatus adapted to lessen the thermal stress while the strength of the apparatus with respect to an external force, such as vibration and an impact is maintained. Some portions of a frame of the apparatus in the length measuring direction are completely fixed to an object machine, and some other portions in the length measuring direction of the frame are elastically fixed to the object machine by using a bush provided with an elastic layer between the bush and the frame.

5 Claims, 6 Drawing Sheets

US 6,766,587 B2

MULTI-POINT FRAME-FIXING UNIT TYPE LINEAR DISPLACEMENT MEASURING APPARATUS AND METHOD OF FIXING THE SAME

BACKGROUND OF THE INVENTION

1. Field of the Invention

This invention relates to a multi-point frame-fixing unit type linear displacement measuring apparatus formed so that a frame thereof containing a main scale therein and extending in the length measuring direction is fixed to an object machine at a multiplicity of points of not smaller than three points, and a method of fixing the apparatus.

2. Description of the Related Art

In order to detect the linear displacement of a relatively moving object machine (moving body) for the purpose of carrying out, for example, a feedback control operation in a machine tool and an industrial machine, a unit type linear scale has been generally used, which is formed in one body as shown in FIG. 1, by an elongated frame 10 of, for example, aluminum in which a main scale of, for example, glass is housed, and a detecting head 14 relatively movable with respect to the frame 10 and having a slider connected thereto and including an index scale for scanning the main scale.

The unit type linear scales include a so-called a multi-point frame-fixing unit type linear scale in which the aluminum frame 10 is fixed directly to an object machine by, for example, fixing screws as shown in FIG. 1.

In this multi-point frame-fixing unit type linear scale, the fixing of the scale is done at a multiplicity of points of not smaller than three points (for example, five points) with the frame 10 contacting a surface of an object machine (an illustration is omitted), so that this scale has the advantages of resisting an external force, such as vibration and an impact. This scale is also advantageous in that, when the number of the scale-fixing positions is increased by arranging the fixing screws 12 at constant intervals of, for example, 200 to 250 mm through the frame 10 over the whole length thereof, the dependency of the resonance frequency of the frame 10 upon the length thereof can be reduced to a low level.

However, when a method of fixing the scale to a machine tool formed mainly out of iron, by completely securing the scale at all of the mentioned points by the fixing screws 12 is used, thermal stress caused by temperature variation at the screw-fixed portions occurs due to a difference between the linear expansion coefficient of iron and that of aluminum. This thermal stress causes the deformation and distortion of the frame 10 and the main scale provided in the interior thereof, and the accuracy of the scale to be deteriorated. In addition, due to the thermal stress as well occurring in the screw fixed portions, the position of the frame 10 with respect to the surface of the object machine slips minutely, and the origin stability of the position of the scale in the length measuring direction is deteriorated.

SUMMARY OF THE INVENTION

The present invention has been made so as to solve these problems of the related art apparatus and method of this kind, and mainly aims at minimizing the occurrence of thermal stress with excellent characteristics with respect to an external force, such as vibration and an impact maintained.

The present invention solves the above-mentioned problems of a multi-point frame-fixing unit type linear displacement measuring apparatus which is formed such that a frame thereof containing a main scale therein and extending in the length measuring direction is fixed to an object machine at a multiplicity of points of not smaller than three points, by fixing some portions in the length measuring direction of the apparatus completely to an object machine, and some other portions in the same direction thereof elastically to the object machine by using bushes provided with an elastic layer between the bushes and the frame.

The first-mentioned parts of the apparatus are fixed to the object machine completely by using a plurality of fixing members.

The thickness of the elastic layer of such bushes may be set larger as the layer is far from the completely fixed portions is set larger.

The present invention provides a method of fixing a multi-point frame-fixing unit type linear displacement measuring apparatus formed such that a frame thereof containing a main scale therein and extending in the length measuring direction is fixed to an object machine at a multiplicity of points of not smaller than three points, in which some portions in the length measuring direction of the frame are fixed completely to the object machine, some other portions in the length measuring direction thereof being fixed elastically to the object machine by using bushes provided with an elastic layer between the bushes and the frame.

BRIEF DESCRIPTION OF THE DRAWINGS

Preferred embodiments of the present invention will now be described with reference to the accompanying drawings, wherein.

DESCRIPTION OF THE PREFERRED EMBODIMENTS

The modes of embodiment of the present invention will now be described in detail with reference to the drawings.

Figure 1:
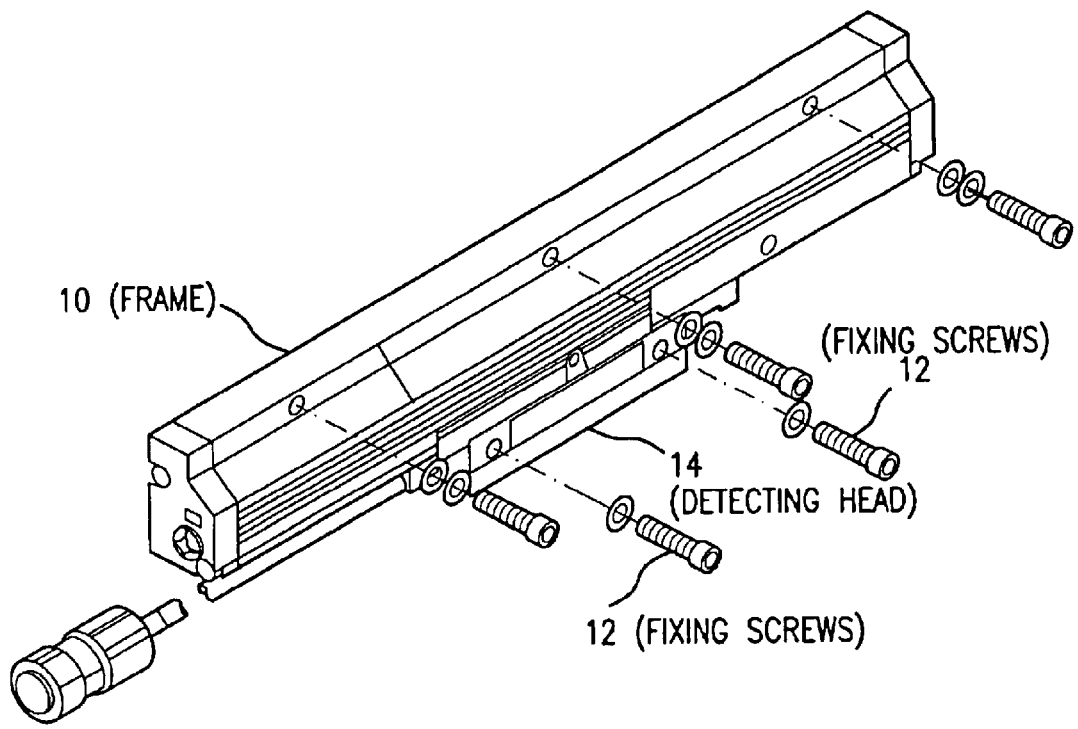
FIG. 1 is a perspective view showing a multi-point frame-fixing unit type linear scale.
Figure 2:
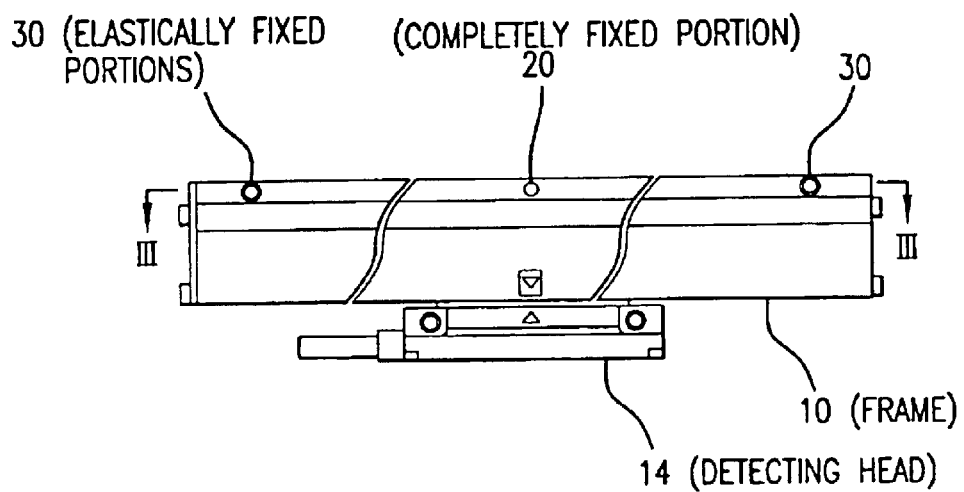
FIG. 2 is a front view showing a general construction of a first mode of embodiment of the present invention.
Figure 3:
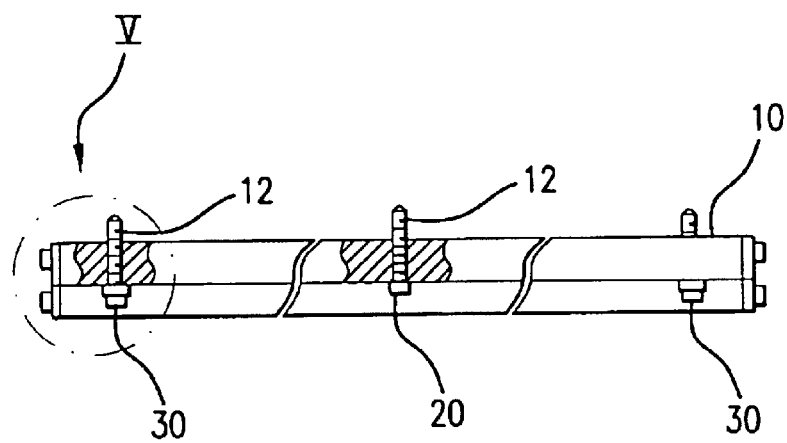
FIG. 3 is a cross-sectional view taken along the line III—III in FIG. 2.
Figure 4:
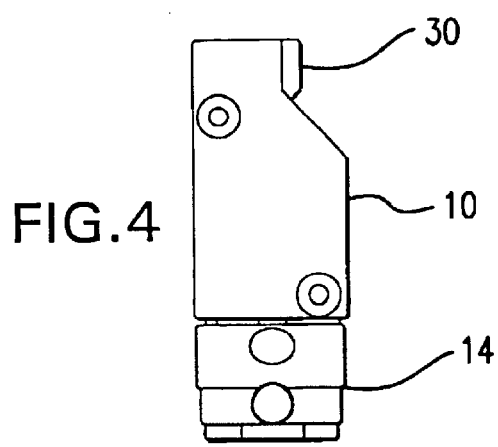
FIG. 4 is a side view of the first embodiment.
Figure 5:
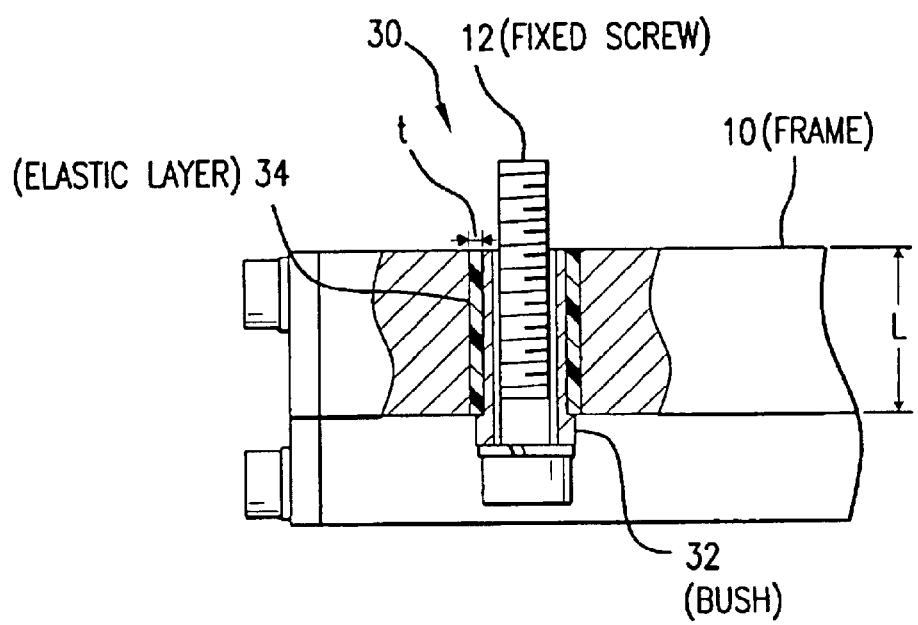
FIG. 5 is an enlarged sectional view of a V-portion of FIG. 3.

A first embodiment of the present invention is a multi-point frame-fixing unit type linear scale similar to a related art linear scale as shown in FIG. 2 (front view), FIG. 3 (cross-sectional view taken along the line III—III in FIG. 2) and FIG. 4 (side view), in which a central portion in the length measuring direction of a frame is formed as a completely fixed portion 20 to be fixed completely to an object machine by using a fixing screw 12, and in which both end portions in the length measuring direction thereof are formed as shown in detail in FIG. 5 as elastically fixed portions 30 each of which is to be fixed by a fixing screw and by using a bush 32 provided with an elastic layer 34 between the bush 32 and the frame 10.

The bush 32 is formed out of, for example, a metal, such as stainless steel, and the elastic layer 34 out of, for example, a silicon bonding agent or a rubber-based resin.

When temperature variation occurs, the frame 10 expands and contracts to left and right equally with respect to the central completely fixed portion 20 which is fixed as in the related art linear scale. During this time, the elastically fixed portion 30 absorbs the lengthwise expanded and contracted portions of the frame 10 owing to the variation of the elastic layer 34, so that the occurrence of thermal stress is reduced.

Since a force for tightening the fixing screw 12 occurs in the bush 32, a frictional force, which occurs in a contact surface of the frame 10 with an object machine, decreases. Therefore, the behavior of extension of the frame 10 due to temperature variation becomes stable, and the deterioration of the accuracy of the frame can be reduced.

Since the central portion of the frame is completely fixed by the fixing screw 12, a slip of the frame 10 with respect to the object machine due to temperature variation decreases, and the stability of a mechanical origin with respect to the length measuring direction is improved. The mechanical origin can be set arbitrarily by setting a completely fixed portion 20 in an arbitrary position other than in the central portion of the frame 10.

The temperature characteristics (extension absorption rate) and strength the elastic layer 34 of the elastically fixed portion 30 with respect to an external force can be regulated by varying its thickness t, length L, material and the number of arrangement in the lengthwise direction thereof.

Figure 6:
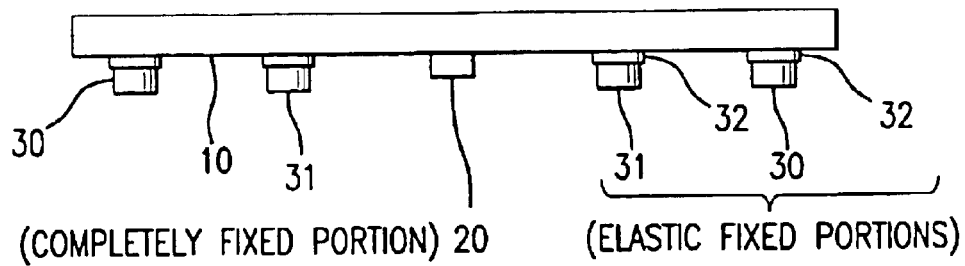
FIG. 6 is a plan view showing an arrangement of a completely fixed portion and elastically fixed portions in a second mode of embodiment of the present invention.

When a plurality of elastically fixed portions 30, 31 are provided in positions of different distances away from the completely fixed portion 20 as in, for example, a second embodiment shown in FIG. 6, it is possible that the thickness t of the elastic layer 34 in a position in which an absorption rate in the lengthwise direction is higher (i.e. a position farther away from the completely fixing portion 20) be increased more greatly.

Figure 7:
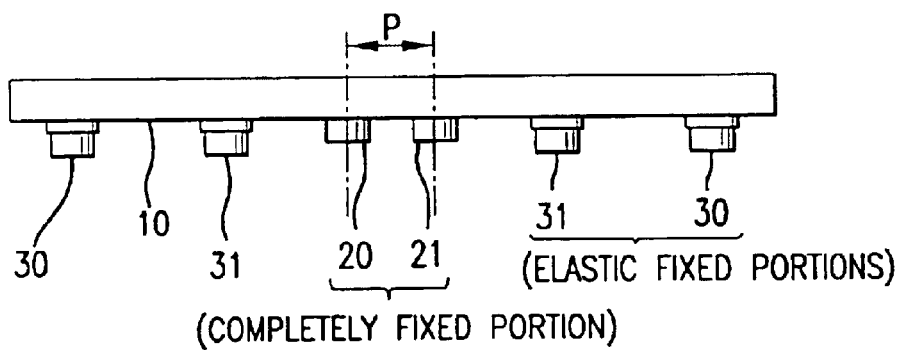
FIG. 7 is a plan view showing an arrangement of completely fixed portions and elastically fixed portions in a third mode of embodiment of the present invention.
Figure 8:
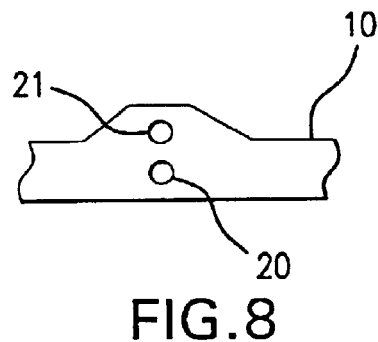
FIG. 8 is a front view showing an arrangement of a completely fixed portion in a fourth mode of embodiment of the present invention.
Figure 9:
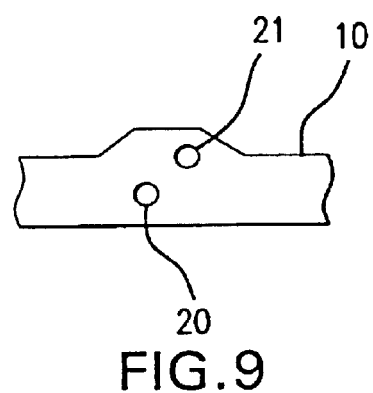
FIG. 9 is a front view showing an arrangement of a completely fixed portion in a fifth mode of embodiment of the present invention.

In a linear scale having a total length of, for example, as large as 1 m or longer, it is possible that completely fixed portions 20, 21 be formed in two central points taking the strength of the frame in the directions other than the lengthwise direction thereof into consideration as in a third embodiment shown in FIG. 7. In this case, the distance p between the two central points may be set without trouble in such a range (around 30 mm at largest when the object machine is made of iron) that permits the practical influence upon the temperature characteristics to be reduced. In addition, it is also possible to completely fix the frame 10 at two vertical points 20, 21 to an object machine as in a fourth embodiment shown in FIG. 8, or completely fix the frame 10 at two diagonal points 20, 21 to an object machine as in a fifth mode of embodiment shown in FIG. 9. When the frame 10 is completely fixed at two points to an object machine as in the third to fifth embodiment, the turning of the frame 10 can be prevented.

It is possible that the elastic layer 34 be given an external force attenuating function (damping effect).

When the number of fixing portions of the frame 10 is increased in accordance with the length thereof with a constant interval of the fixing portions (for 100 to 250 mm).

Figure 10:
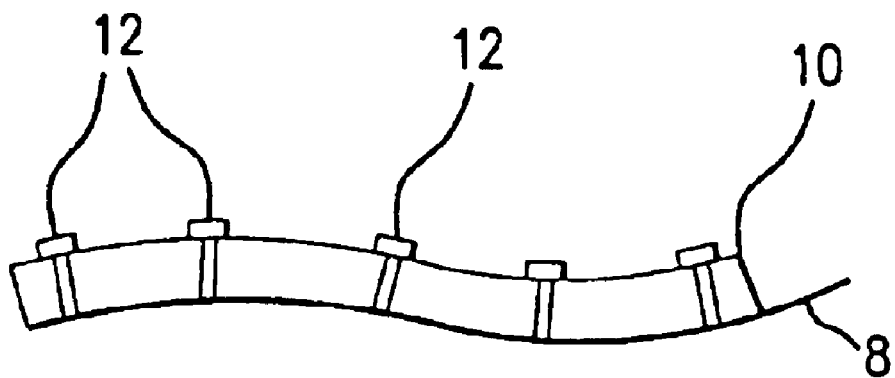
FIG. 10 is a longitudinal sectional view for describing a problem, which is not referred to in the above paragraphs, of the multi-point fixing type linear scale.
Figure 11:
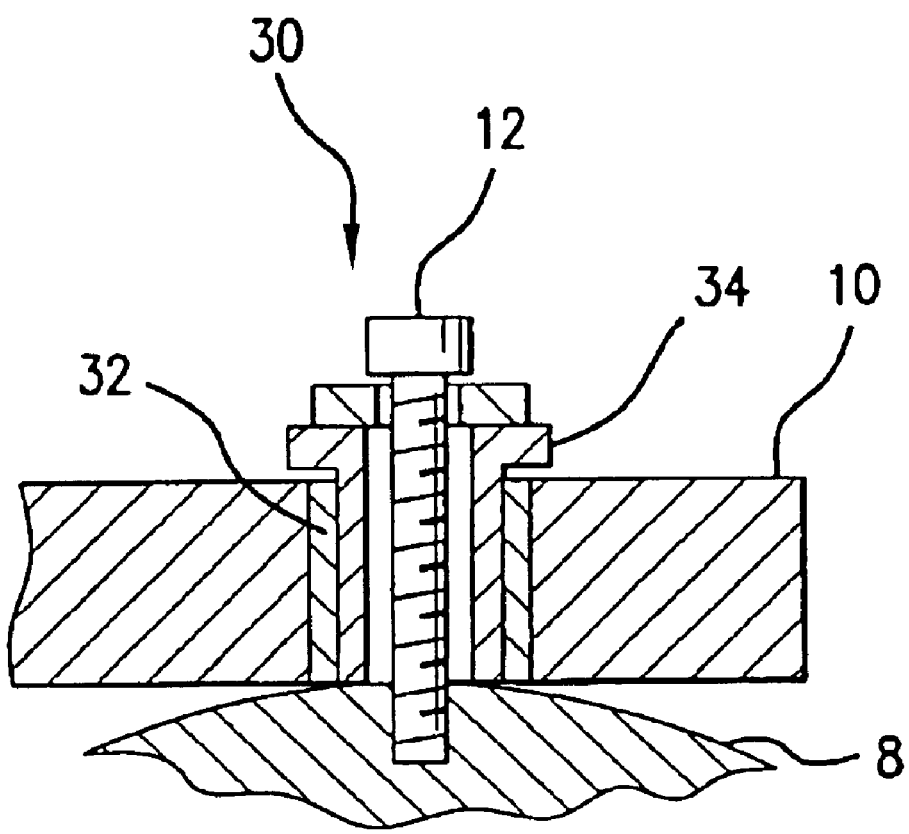
FIG. 11 is an enlarged sectional view showing the condition in which the problem shown in FIG. 10 is solved by the present invention.
Figure 12:
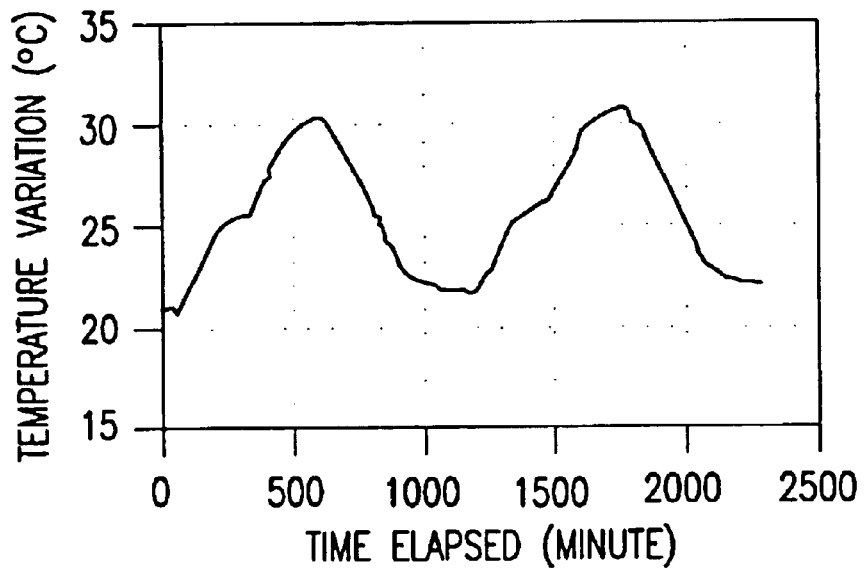
FIG. 12 is a time chart showing temperature variation in an embodiment.
Figure 13:
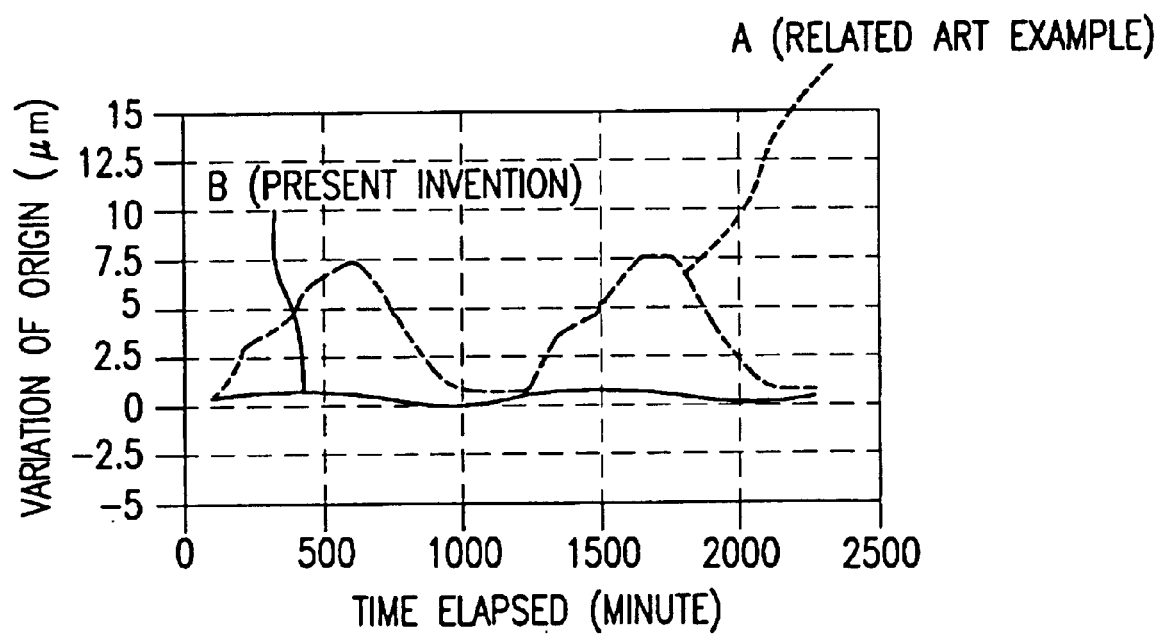
FIG. 13 is a time chart comparatively showing position variation, which occurs when the temperature variation shown in FIG. 12 occurs, of origins in the related art linear scale and that thereof in an embodiment of the present invention.

When the frame 10 is completely fixed to the surface of an object machine at multiple points, if it 8 winding in and out as shown in FIG. 10, there is the possibility that the frame 10 winds in and out along the surface 8 of the object machine. However, it is possible that elastic layer 34 absorbs this winding of the object surface 8 owing to the deformation thereof, and prevent the frame 10 from being wound in and out. Embodiment:

The position variation in the length measuring direction of an origin (central portion) of an aluminum frame 10 of a total length of 500 mm of a linear scale in a case where temperature variation shown in FIG. 12 occurs is shown in FIG. 13. It is desirable that position variation of the origin due to temperature variation be zero. However, in the related art linear scale in which all the fixing portions of the frame thereof are completely fixed, the fluctuation of a value of an origin shown by a broken line A in FIG. 13 occurs. On the other hand, in the embodiment of the present invention in which one central portion of the frame is completely fixed while the other fixed portions thereof are elastically fixed by using an elastic layer 34 of a thickness t=0.15 and a length L=14 mm and a stainless steel bush 32, it has been ascertained that the completely fixed portion (central portion) becomes a definite origin as shown by a solid line B in FIG. 13, and that the absorption of the extension of the frame owing and a decrease in occurrence of friction between the frame and the surface of an object machine are achieved by using the elastic layer and position variation of the origin can be minimized.

Figure 14:
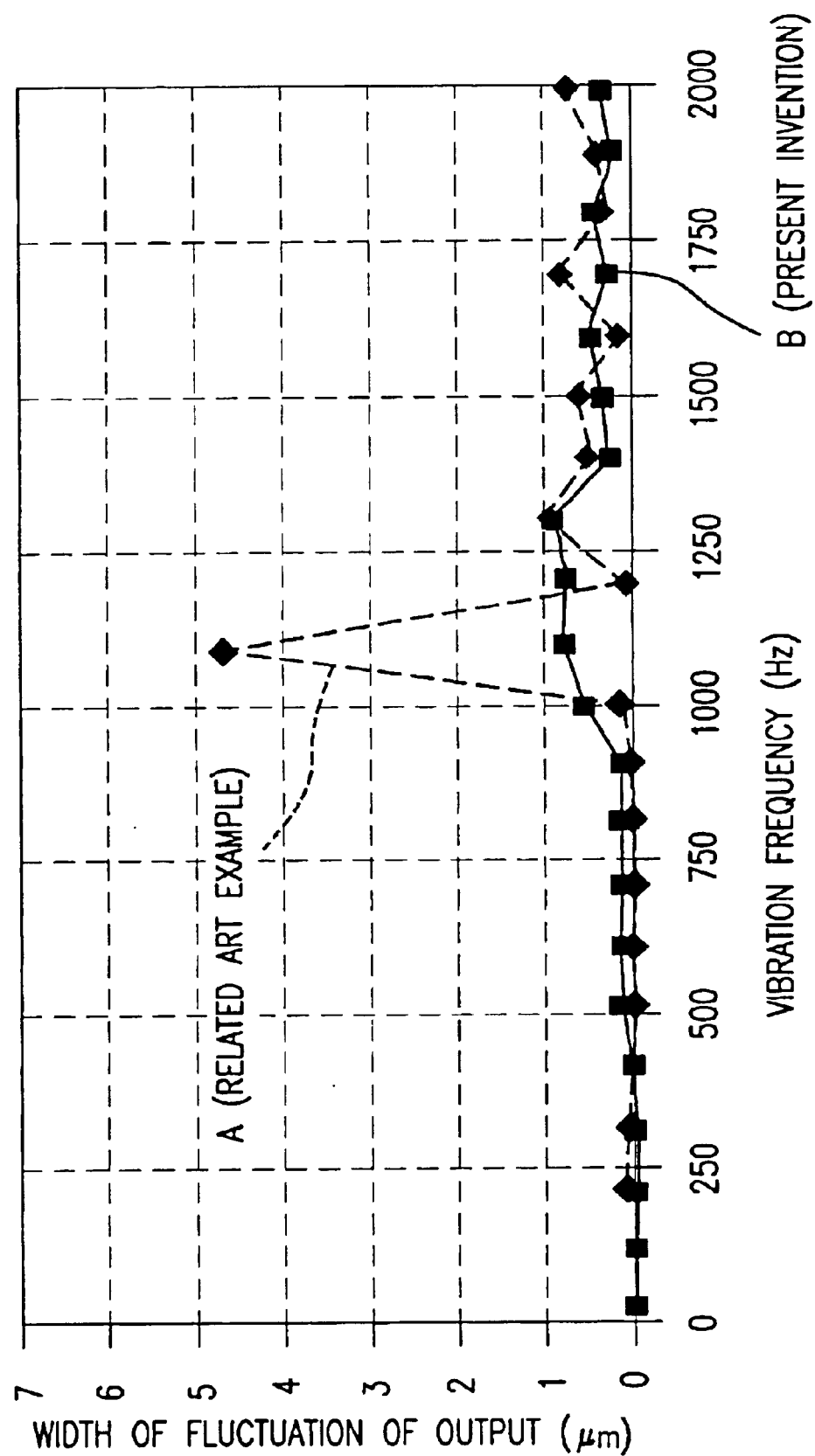
FIG. 14 is a diagram comparatively showing the relation between a vibration frequency and an output fluctuation due to the vibration in the related art linear scale and that in the linear scale in an embodiment of the present invention.

The results of experiments on the relation between vibration frequency and output fluctuation due to vibration are shown in FIG. 14. In both of the experimental results shown by a broken line of the related art linear scale and those shown by a solid line of the embodiment of the linear scale according to the present invention, resonance zones exist around a band of 1000 to 1250 Hz. However, in the case of the embodiment, the external force is attenuated by a damping effect of the elastic layer 34, so that an amplitude component of the aluminum frame 10 becomes small. As a result, the width of fluctuation of output decreases to a negligible level. The resonance zone can also be regulated by varying the intervals of the arrangement of the elastically fixing portions 30, 31 in the lengthwise direction of the frame.

In this mode of embodiment, description has been given of the case that the frame 10 is made of aluminum, the bush 32 is made of stainless steel, and the main scale is made of glass, however, the materials of these are not limited to them. The material of the elastic layer 34 is also not limited to a silicon bonding agent or a rubber-based resin.

According to the present invention, the thermal stress can be lessened while the strength of the linear scale with respect to an external force, such as vibration and an impact is maintained.

What is claimed is:

1. A multi-point frame-fixing unit type linear displacement measuring apparatus formed such that a frame containing a main scale therein and extending in the length measuring direction is fixed to an object machine at a multiplicity of points of not smaller than three, wherein:
   a portion in the length measuring direction of the frame is completely fixed to the object machine and
   some other portions in the length measuring direction of the frame are elastically fixed to the object machine by using a bush provided with an elastic layer between the bush and the frame.

2. A multi-point frame-fixing unit type linear displacement measuring apparatus according to claim 1, wherein a portion in the length measuring direction of the frame is completely fixed to an object machine by using a plurality of fixing members.

3. A multi-point frame-fixing unit type linear displacement measuring apparatus according to claim 1, wherein it is set that the farther away from the completely fixed portion, the larger is the thickness of said elastic layers.

4. A multi-point frame-fixing unit type linear displacement measuring apparatus according to claim 2, wherein it is set that the farther away from the completely fixed portion, the larger is the thickness of said elastic layer.

5. A method of fixing a multi-point frame-fixing unit type linear displacement measuring apparatus formed such that a frame containing a main scale therein and extending in the length measuring direction is fixed to an object machine at a multiplicity of points of not smaller than three, by completely fixing some portion of the apparatus in the length measuring direction to the object machine, and elastically fixing some other portions of the apparatus in the length measuring direction to the object machine by using a bush provided with an elastic layer between the bush and the frame.

* * * * *